United States Patent
Gupta (10) Patent No.: US 11,316,861 B2
(45) Date of Patent: Apr. 26, 2022

(54) AUTOMATIC DEVICE SELECTION FOR PRIVATE NETWORK SECURITY

(71) Applicant: Avast Software s.r.o., Prague (CZ)

(72) Inventor: Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 217 days.

(21) Appl. No.: 16/455,480

(22) Filed: Jun. 27, 2019

(65) Prior Publication Data
US 2020/0412728 A1 Dec. 31, 2020

(51) Int. Cl.
*H04L 9/40* (2022.01)
*H04L 29/06* (2006.01)

(52) U.S. Cl.
CPC ........ *H04L 63/102* (2013.01); *H04L 63/1416* (2013.01); *H04L 63/1433* (2013.01); *H04L 63/1441* (2013.01); *H04L 63/164* (2013.01); *H04L 63/0272* (2013.01)

(58) Field of Classification Search
CPC ............... H04L 63/102; H04L 63/1416; H04L 63/1433; H04L 63/1441; H04L 63/164; H04L 63/0272
See application file for complete search history.

(56) References Cited

U.S. PATENT DOCUMENTS

| | | | |
|---|---|---|---|
| 8,225,407 B1* | 7/2012 | Thrower | H04L 63/1441 726/25 |
| 9,497,212 B2* | 11/2016 | Turnbull | H04L 63/1425 |
| 2002/0199116 A1* | 12/2002 | Hoene | H04L 63/145 726/24 |
| 2005/0108557 A1* | 5/2005 | Kayo | H04L 63/20 713/189 |
| 2013/0174218 A1* | 7/2013 | Sasaki | H04L 63/102 726/1 |
| 2013/0326627 A1* | 12/2013 | Zhao | G06F 21/566 726/25 |
| 2016/0099963 A1* | 4/2016 | Mahaffey | G06F 21/554 726/25 |
| 2018/0041533 A1* | 2/2018 | Chesla | H04L 63/1433 |
| 2019/0199605 A1* | 6/2019 | Malboubi | H04L 63/1408 |
| 2020/0050761 A1* | 2/2020 | Lancioni | H04L 63/1416 |
| 2020/0092374 A1* | 3/2020 | Mehta | G06F 21/121 |
| 2021/0092136 A1* | 3/2021 | Woodworth | H04L 63/126 |

* cited by examiner

*Primary Examiner* — Sarah Su
(74) *Attorney, Agent, or Firm* — AVEK IP, LLC; William B. Kircher (57) ABSTRACT

A method of selecting devices on a private network for security protection via a network security device comprises classifying devices on the private network into devices that are sometimes protected and devices that are always either protected or not protected. Threats are monitored, the threats comprising at least one of a macro security event and a local security event, the macro security event detected by one or more external systems and the local security event detected by one or more devices local to the private network. When a threat is detected, it is determined whether the detected threat is a threat to one or more devices on the private network classified as devices that are sometimes protected, and if the detected threat is determined to be a threat to the one or more devices that are sometimes protected the one or more devices are protected.

20 Claims, 3 Drawing Sheets

AUTOMATIC DEVICE SELECTION FOR PRIVATE NETWORK SECURITY

FIELD

The invention relates generally to security in computerized systems, and more specifically to automatic selection of devices to be protected by private network security.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, a firewall in a home or office may restrict the types of connection and the data that can be transferred between the internal network and an external or public network such as the Internet, based on firewall rules and characteristics of known malicious data. The firewall is typically a computerized network device that inspects network traffic that passes through it, permitting passage of desirable network traffic while blocking undesired network traffic based on a set of rules. A firewall or similar network security device may be integrated into a home or small business router, or may be a standalone device such as a device connected to a router and configured to filter traffic coming into a private network from a public network before forwarding it to devices on the private network.

In a more detailed example of a standalone security device not integrated within a router, the network security device is coupled to the router via a network connection and is configured to receive or intercept data sent between external computer systems and devices on the internal private network. This is achieved in one example by using Address Resolution Protocol (ARP) spoofing, by which the security device associates its own MAC address with the IP address of a different device that is a target of communication. The security device can then intercept the network data and screen it before forwarding it to the intended destination, such as an internal private network device. In other examples, other methods are similarly used to configure the security device between the external network and internal or private network devices.

But, such solutions can be computationally expensive to implement, especially where large volumes of network data such as streaming video or downloaded software are sent between high-performance computerized devices. Further, the network traffic load experienced by the network security device may be significant if many data flows are routed through the device. It is therefore desirable to manage analysis of data passing between public and private networks to provide efficient detection of vulnerabilities.

SUMMARY

In one example embodiment of the invention, a method of selecting devices on a private network for security protection via a network security device comprises classifying devices on the private network into devices that are sometimes protected and devices that are always either protected or not protected. A network security device monitors threats comprising at least one of a macro security event and a local security event, the macro security event detected by one or more external systems and the local security event detected by one or more devices local to the private network. When a threat is detected, the network security device determines whether the detected threat is a threat to one or more devices on the private network classified as devices that are sometimes protected, and if the detected threat is determined to be a threat to the one or more devices that are sometimes protected the one or more devices are protected.

In a further example, the one or more devices are protected by the network security device inserting itself into a network data flow between the one or more devices and the public network, such as by using Address Resolution Protocol (ARP) spoofing or another suitable method. The network security device then acts as a "man in the middle," intercepting, checking, and selectively filtering data packets before sending them to their intended destination to provide security by filtering out malicious data.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common documents are all frequently infected with malware of various types, and so users rely on tools such as antivirus software or other malware protection tools to protect their computerized devices from harm.

An increasing number of computerized devices such as home appliances, vehicles, and other devices (known collectively as the Internet of Things, or IoT) are connected to public networks and are also susceptible to unauthorized interception or modification of data. For example, many popular security cameras are known to have vulnerabilities through which attackers can access the device without authorization, enabling the attackers to view and record image data from the cameras or to control camera operation. Similar vulnerabilities are known to exist or may exist in other IoT devices, including network-connected home security systems such as electronic locks, home appliances such as smart thermostats or kitchen appliances, and vehicles with network access. The Internet of Things, and associated potential security risks, extend to a wide variety of other environments and applications including commercial applications such as manufacturing monitoring and control systems, medical and health care devices used to diagnose or treat medical conditions, and infrastructure monitoring and control such as bridges, railways, wind farms, and the like.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes.

A firewall or similar network security device in a home or office may be integrated into a router, or may be a standalone device such as a device connected to a router and configured to filter traffic coming into a private network from a public network before forwarding it to devices on the private network. In a more detailed example of a standalone security device, the device is coupled to a router via a network connection and is configured to receive or intercept data sent between external computer systems and devices on the internal private network, such as by Address Resolution Protocol (ARP) spoofing, Dynamic Host Configuration Protocol (DHCP) settings, or another suitable method.

In ARP spoofing, the security device associates its own MAC addresses with the IP addresses of the network's router and at least one device on the private network to be protected by the security device, such that a substitute MAC address of the network security device is associated with the protected device's IP address rather than the protected device's own MAC address. The security device achieves this in a more detailed example by sending ARP packets across the internal network that contain the security device's MAC address and the protected device's IP address, such that other devices on the network such as the router and switches will cache the MAC address of the security device as being associated with the protected device's IP address. Network data on the internal network destined for the protected device will therefore instead be routed to the security device, which can screen it before forwarding it to the protected device on the private network. This process is repeated for other devices to be protected. In a further example, a similar process is also performed for the router such that the outbound traffic from local network devices destined for the router is also filtered by the security device. In one such example, network traffic from private network devices destined for the router's IP address are routed to the security device via a spoofed MAC address associated with the router's IP address, distributed by ARP request packets as described above.

But, such systems can be computationally expensive to implement, especially where large volumes of network data such as streaming video or downloaded software are sent between high-performance computerized devices. Further, some relatively higher-performance devices on the internal network such as servers, desktop computers, and smartphones may have their own security software installed, and may not benefit from additional screening from a security device. Some security devices attempt to address these challenges by monitoring only the first several packets of a new data flow between networked devices, and will stop monitoring the flow if no indication of malicious activity is found. This method saves computational overhead for the packets in the data flow that are not processed, but it still incurs significant bandwidth overhead as the entire data flow is still routed through the network security device with no benefit because the ARP spoofing mechanism used to intercept the data flow cannot be turned on or off with a few packets' notice.

Some example embodiments described herein therefore seek to manage available resources for analysis of data passing between public and private networks by automatically selecting certain devices on the internal network for protection via the security device. In a further example, selection is based on the type of device and the volume of incoming network data the device is likely to receive, as well as detection of at least one of local or macro security threats that may affect the device.

Figure 1:
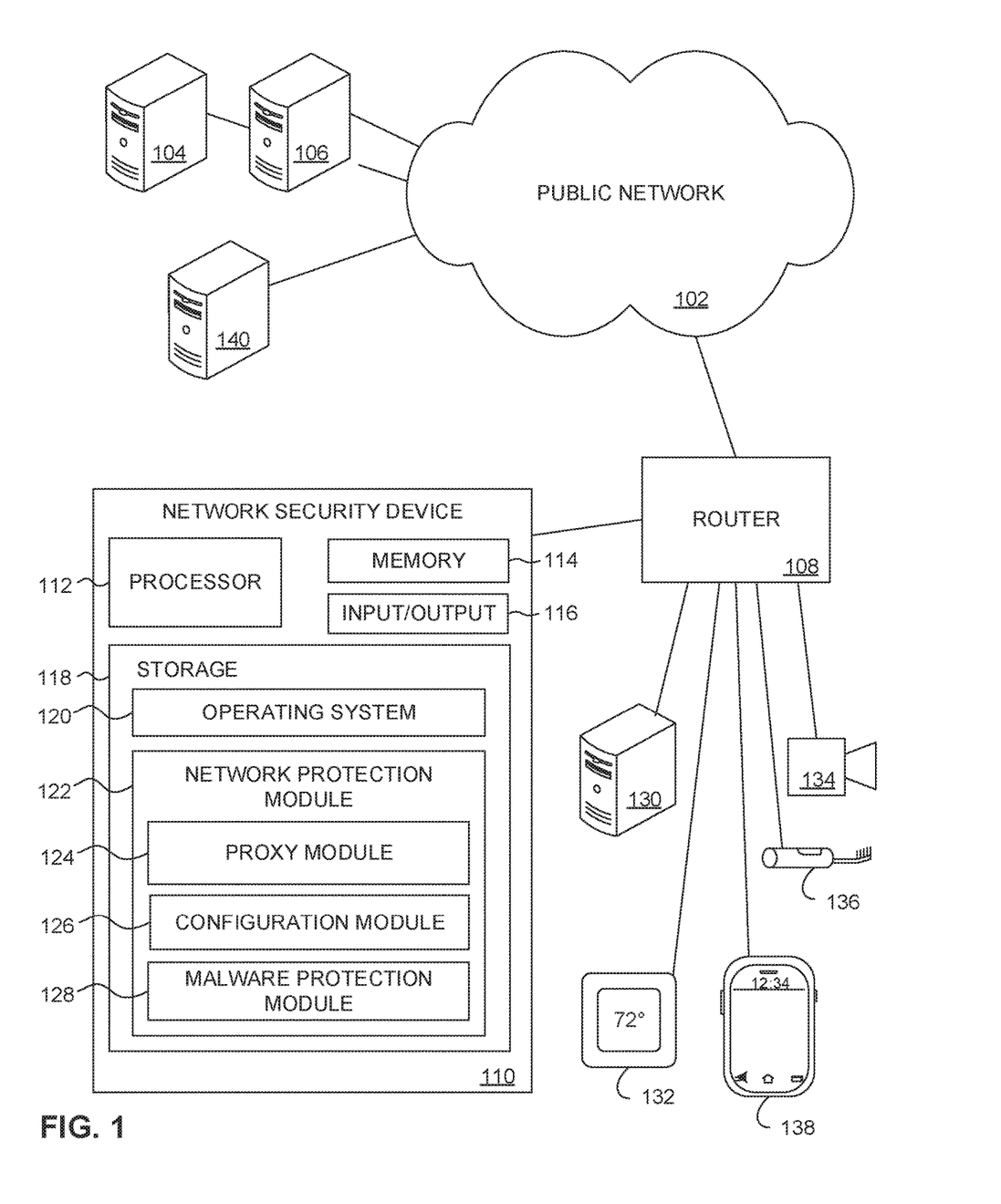
FIG. 1 shows a private network with a network security device operable to selectively protect private network devices, consistent with an example embodiment.

FIG. 1 shows a private network with a network security device operable to selectively protect private network devices, consistent with an example embodiment. Here a public network 102 links remote computer systems such as servers 104 and 106 to a private local network via router 108. The private network in this example includes network security device 110, which includes a processor 112, memory 114, input/output 116 (such as a network interface), and storage 118. The storage stores instructions executable on processor 112 to perform certain functions, including operating system 120 and network protection module 122.

The network protection module includes a proxy module 124 which is operable to intercept traffic between one or more private network devices and the public network 102, as well as a configuration module 126 operable to control which private network devices receive protection and malware protection module 128 which is operable to screen traffic between the public network 102 and selected private network devices for various malware or threats. In a further example, the network protection module 122 is configured to exchange data via the public network 102 with one or more cloud or remote security servers 140. The private network also includes one or more private network devices, such as computer 130, smart thermostat 132, camera 134, smart toothbrush 136, and smartphone 138. The network security device in this example is configured to protect the private network devices from threats such as attacker 140, also connected to the private network.

In operation, the various devices on the private network, such as computer 130, smart thermostat 132, camera 134, smart toothbrush 136, and smartphone 138, are configured to exchange data with one or more computerized devices on the public network, such as servers 104 and 106. For example, computer 130 and smartphone 138 may load web pages and emails from public network servers, while smart thermostat 132 and camera 134 send data regarding their operation to servers configured to facilitate control and storage of HVAC and captured video data. Smart toothbrush 136 similarly may exchange information with a public network server, such as sending usage statistics to track and ensure effective toothbrush usage and to trigger notification or ordering when a replacement brush head is needed.

Because each of these private network devices is operable to exchange data with other computerized devices, including those on the public network, they are vulnerable to the data being intercepted and tampered with or to being attacked with various types of malicious software or malware. For example, attacker 140 may target computer 130 with viruses that infect the computer and perform functions such as mine cryptocurrency, send spam emails, encrypt files that are held ransom for payment (ransomware), or other such malicious activity. Smart thermostat 132 may have its heating and cooling setting tampered with, or may have other features such as an interactive voice service such as Alexa® tampered with to enable eavesdropping or other malicious activity. Similarly, camera 134 may be hacked such that attacker 140 or another remote user on the public network 102 can monitor activity visible to the camera or use other functions such as a speaker to interact with people local to the camera. Smart toothbrush 136 in this example simply reports its identity and usage data to a cloud-based server on the public network, and is at minimal risk of being hacked because doing so provides little or no benefit to the attacker 140.

The private network devices 130-138 communicate with devices on the public network 102 via router 108, which directs traffic from the private network devices 130-138 to the public network and from the public network to the intended private network devices. In the example of FIG. 1, the network security device 110 will employ its proxy module 124 to selectively "spoof" or take the place of the router to one or more of the local network devices 130-138, and will selectively "spoof" or take the place of one or more of the local network devices 130-138 to the router 108 and devices on the public network 102. In a more detailed example, the network security device 110 uses network protection module 122's proxy module 124 to spoof the IP address of select devices on the private network, as selected by configuration module 126. The malware protection module 128 is then operable to screen or filter network traffic between the selected private network devices 130-138 and the public network, such as to block known or suspected malware or other security threats in network traffic from the public network to the private network devices.

In the example of FIG. 1, some devices such as computer 130 and smartphone 138 are not selected for protection via the network security device 110 because they are relatively powerful devices likely to have their own security tools built in to or installed on the devices. For example, personal computers often have firewalls, antivirus, anti-malware, or similar software installed that protects the computer from the same kinds of threats that network security device 110 is designed to protect against, and smartphone 138 similarly typically has antivirus or anti-malware software executing on the device in addition to other protections such as restrictions on loading executable code onto the device such as enforcing installation through a regulated app store. Other private network devices such as smart toothbrush 136 are always selected for protection because the devices typically generate very little incoming network traffic and the computational and network bandwidth cost to the network security device in protecting them is low.

Smart thermostat 132 and video camera 134 are in this example part of a third group of private network devices that are selectively protected by the network security device 110, based on factors such as detection of security events. Selective protection in a further example is triggered by detection of a macro security event, detection of a local security event, or based on other information such as news reports or threat feeds provided to the network security device. In a more detailed example, macro security events include events that occur in a specific geography, such as in the geographic country or in the network region in which the private network resides. Macro security events also include detection of a vulnerability or suspicious activity in a particular type of device, including a specific router such as router 108 or a specific network device such as video camera 134. Local security events include detection of a local breach within the private network, such as when unusual or suspicious activity is detected in any of devices including router 108 or private network devices 130-138. News reports or threat feeds include reports of threats that have not been observed by the network security device 110 or affiliated cloud services such as a cloud server 104 or 106 configured to share information regarding detected threats with network security device 110. In a further example, selective protection for a private network device is similarly turned off when a detected threat is determined to no longer be present, or when such a threat has diminished to an acceptable level.

The network security device 110 provides protection to devices that have been selected in a further example by taking advantage of network protocols for establishing network address records to insert itself between communicating network devices. A new device attached to a private network is typically assigned an IP address using the Dynamic Host Configuration Protocol, or DHCP, via a DHCP server (such as router 108) that is responsible for ensuring each device on the private network has a unique IP address. The new device broadcasts a DHCP discovery request on the private network, and one or more DHCP servers receive the request and reserve an IP address which is then offered to the new device. The new device replies with a DHCP request accepting the reserved IP address from a DHCP server (accepting only a single offer if multiple IP address offers are received), which the DHCP server then acknowledges. The new device then sends an Address Resolution Protocol (ARP) request across the network, ensuring it is the only device on the private network using the assigned IP address.

When the new device wishes to communicate with another device on the network, it broadcasts an ARP request packet with the intended destination's IP address. The intended destination computer responds with its MAC address, which the new device and any other listening devices then store in an ARP table associated with the intended destination's IP address for future use. The new device can now use the intended destination's MAC address to communicate with the intended destination device.

The network security device 110 of FIG. 1 in some examples uses ARP spoofing to selectively "spoof" or take the place of the router to one or more of the local network devices 130-138, and to selectively "spoof" or take the place of one or more of the local network devices 130-138 to the router 108. In both cases, the network security device forwards data received as a result of such "spoofing" to the intended destination after screening the data, enabling the network security device 110 to monitor and restrict communication between local devices 130-138 and the router (including traffic between local devices 130-138 and the public network via the router). ARP spoofing is achieved in a more detailed example by sending an ARP announcement broadcast to other devices on the private network that falsely updates IP to MAC address mapping in private network devices so that data intended for select devices instead is routed to the network security device's MAC address, enabling network security device to insert itself as "man-in-the-middle" between select private network devices 130-138 and the router. In other examples, techniques other than ARP spoofing are used, such as inserting network security device 110 in between the router and the private network devices 130-138, or configuring router 108 to route select traffic through the network security device before forwarding it to select private network devices using other methods.

Examples such as these enable the network security device to selectively protect devices such as smart thermostat 132 and video camera 134, while ignoring traffic to devices such as computer 130 and smartphone 138 that are likely able to protect themselves, as well as to always monitor other devices such as smart toothbrush 136 which generates a very small amount of network traffic. This reduces the computational burden on network security device 110, as it need not protect devices that are capable of protecting themselves, and can selectively protect potentially higher risk devices based on factors such as local and regional threat observations and the amount of network traffic generated by the network device.

Figure 2:
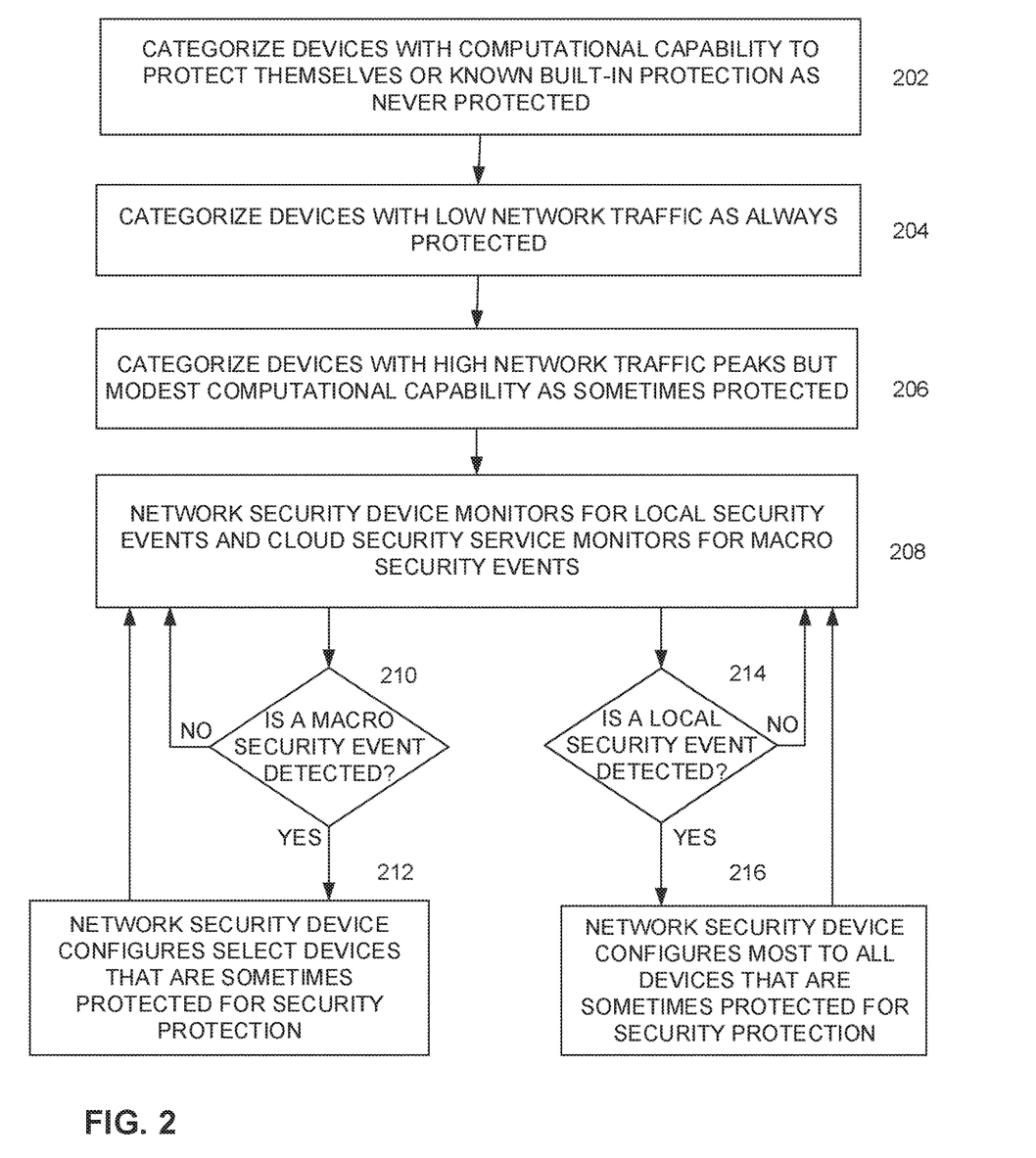
FIG. 2 is a flowchart of a method of categorizing private network devices to selectively protect, consistent with an example embodiment.

FIG. 2 is a flowchart of a method of categorizing private network devices to selectively protect, consistent with an example embodiment. At 202, devices that have the computational capability to protect themselves are categorized as never protected. This includes devices such as personal computers, smartphones, tablet computers, routers, and the like. In a further example, devices known to have adequate security safeguards in place, such as smartphones that are running security software or that have safeguards such as app stores that limit distribution of unapproved executable code are never protected, while select devices lacking such security features may not be categorized as never protected.

At 204, devices with low network traffic loads are categorized as always protected, such as wearable devices like a Fitbit or Apple watch, home automation devices such as a smart thermostat or sprinkler system controller, work appliances such as a printer or scanner, home voice assistants such as Amazon Alexa, smart vehicles such as a Tesla, home appliances such as a smart refrigerator, some surveillance or security devices that may transmit some volume of data but that receive relatively little data from outside networks, and other such low-bandwidth devices. In a further example, other devices such as a printer or scanner that may exchange large amounts of data with other devices on the private network but that receive small amounts of data from the public network are considered low bandwidth and are always protected.

At 206, devices with high network traffic peaks and modest computational capability (such as those devices that may not be able to execute their own software security solutions) are categorized as sometimes protected. These selectively protected devices include game consoles such as an Xbox or Playstation, storage devices such as a home Network Attached Storage (NAS) device, and media or television devices such as a smart television or a Roku media streamer. These selectively protected devices may not have the capability to execute their own security solutions, may lack the computational resources to execute their own security solutions, or may have other characteristics that make it desirable for a network security device to selectively protect them.

For devices that are categorized as selectively protected at 206, the network security device monitors for local security events and receives reports of macro security events from a cloud service at 208. Local security events comprise events such as detection of malicious network activity, detection of an infected or compromised private network device, or detection of network activity that is suspicious or uncharacteristic of a private network device. Macro security events comprise events detected by a cloud security service provider such as via its associated network security devices or other means of detection. Events include security threats specific to certain private network devices, such as vulnerabilities of certain devices or operating systems, security threats to particular network elements such as to certain routers or firewalls, security threats that are detected or are growing in a certain geographic region, and security threats that are detected or are growing in a certain area of the public network topology. In a further example, macro events further include reports from other threat feeds, such as from another threat monitoring service or news/reporting provider.

If a macro security event is detected at 210, the network security device selectively configures one or more of the private network devices that are sometimes protected to be protected at 212, such as by broadcasting ARP packets to insert itself into network traffic between the private network device and the public network. This enables the network security device to monitor and selectively forward or filter network traffic between the public network and the selectively protected devices, thereby protecting them from threats known to the network security device. Similarly, if a local security event is detected at 214, the network security device protects one or more of the selectively protected private network devices at 216. In a further example, the network security device reacts to local security events differently than macro security events because local security events are the result of known compromise to one or more local private network devices, such as by selectively protecting all selectively protected devices or temporarily protecting all network devices to minimize impact of the detected threat on the private network. In another example, continuous monitoring for security events at 210 and 214 further comprises detecting when a security event is no longer a threat, such that protection for one or more network devices can be stopped.

The various methods described herein provide the benefit of being able to selectively protect devices that may need protection based on knowledge of security events and characteristics of the device, while always protecting devices that pose little burden and not protecting those devices that are capable of protecting themselves. The examples improve over prior methods such as turning off packet filtering after a several packets in a data stream in that they reduce the network traffic load on the network security device by not routing unnecessary traffic through the device. In other examples, functions such as those described in the examples above will be performed by other devices or modules than those shown in FIG. 1, such as being integrated within a home router, wireless access point, switch, or other such device. One example of the network security device as shown in FIG. 1 is described in greater detail below.

Figure 3:
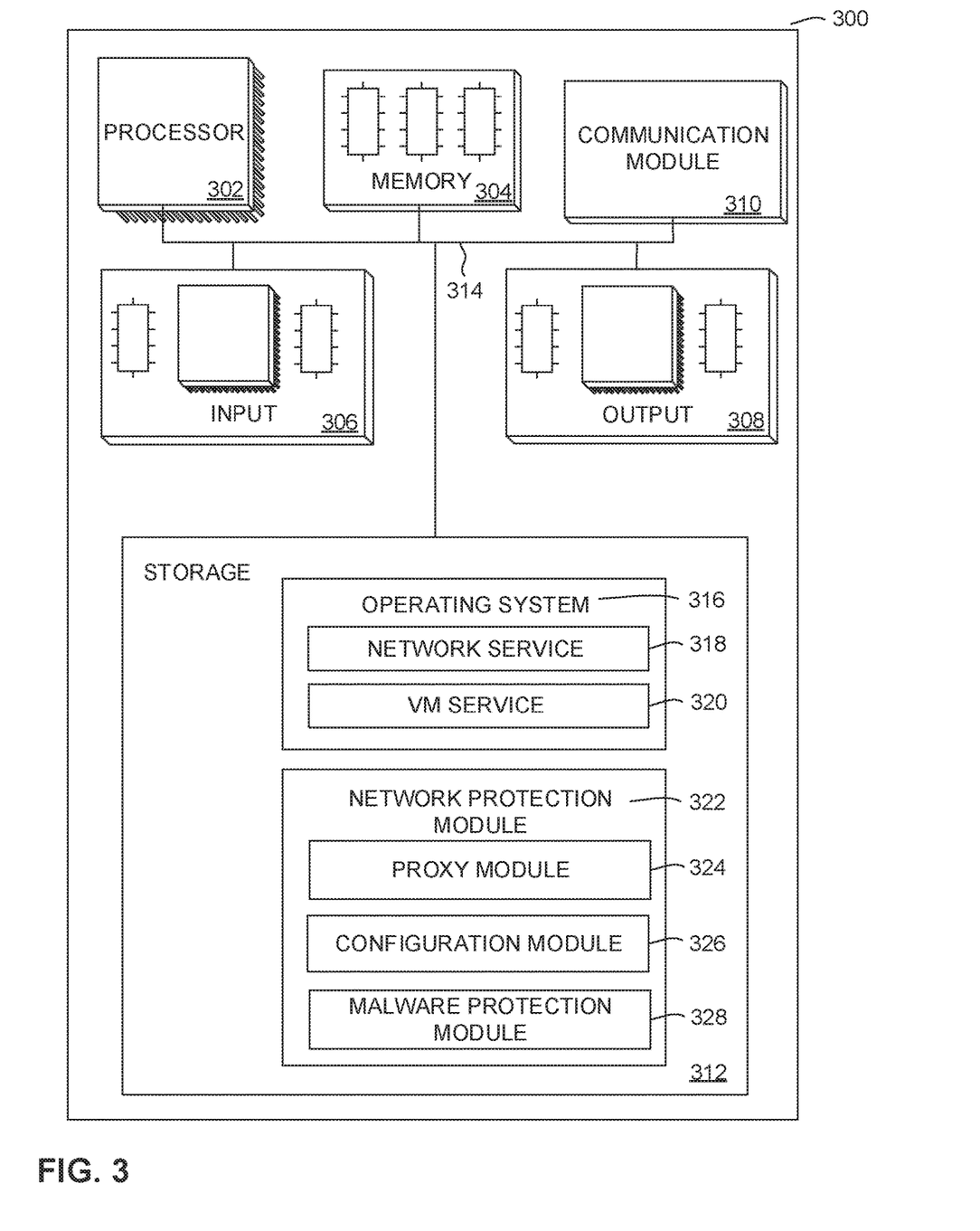
FIG. 3 is a computerized network security device, consistent with an example embodiment of the invention

FIG. 3 is a computerized network security device, consistent with an example embodiment of the invention. FIG. 3 illustrates only one particular example of network security device 300, and other computing devices may be used in other embodiments. Although network security device 300 is shown as a standalone computing device, device 300 may be any component or system that includes one or more processors or another suitable computing environment for executing software instructions in other examples, and need not include all of the elements shown here.

As shown in the specific example of FIG. 3, network security device 300 includes one or more processors 302, memory 304, one or more input devices 306, one or more output devices 308, one or more communication modules 310, and one or more storage devices 312. Device 300 in one example further includes an operating system 316 executable by network security device 300. The operating system includes in various examples services such as a network service 318 and a virtual machine service 320 such as a virtual server or various modules described herein. One or more applications, such as network protection module 322 are also stored on storage device 312, and are executable by network security device 300.

Each of components 302, 304, 306, 308, 310, and 312 may be interconnected (physically, communicatively, and/or operatively) for inter-component communications, such as via one or more communications channels 314. In some examples, communication channels 314 include a system bus, network connection, inter-processor communication network, or any other channel for communicating data. Applications such as network security module 322 and operating system 316 may also communicate information with one another as well as with other components in device 300.

Processors 302, in one example, are configured to implement functionality and/or process instructions for execution within computing device 300. For example, processors 302 may be capable of processing instructions stored in storage device 312 or memory 304. Examples of processors 302 include any one or more of a microprocessor, a controller, a digital signal processor (DSP), an application specific integrated circuit (ASIC), a field-programmable gate array (FPGA), or similar discrete or integrated logic circuitry.

One or more storage devices 312 may be configured to store information within network security device 300 during operation. Storage device 312, in some examples, is known as a computer-readable storage medium. In some examples, storage device 312 comprises temporary memory, meaning that a primary purpose of storage device 312 is not long-term storage. Storage device 312 in some examples is a volatile memory, meaning that storage device 312 does not maintain stored contents when network security device 300 is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on network security device 300 such as network protection module 322 to temporarily store information during program execution.

Storage device 312, in some examples, includes one or more computer-readable storage media that may be configured to store larger amounts of information than volatile memory. Storage device 312 may further be configured for long-term storage of information. In some examples, storage devices 312 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network security device 300, in some examples, also includes one or more communication modules 310. Computing device 300 in one example uses communication module 310 to communicate with external devices via one or more networks, such as one or more wireless networks. Communication module 310 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, network security device 300 uses communication module 310 to communicate with an external device such as via public network 122 of FIG. 1.

Network security device 300 also includes in one example one or more input devices 306. Input device 306, in some examples, is configured to receive input from a user through tactile, audio, or video input. Examples of input device 306 include a touchscreen display, a mouse, a keyboard, a voice-responsive system, a video camera, a microphone, or any other type of device for detecting input from a user.

One or more output devices 308 may also be included in computing device 300. Output device 308, in some examples, is configured to provide output to a user using tactile, audio, or video stimuli. Output device 308, in one example, includes a display, a sound card, a video graphics adapter card, or any other type of device for converting a signal into an appropriate form understandable to humans or machines. Additional examples of output device 708 include a speaker, a light-emitting diode (LED) display, a liquid crystal display (LCD), or any other type of device that can generate output to a user.

Network security device 300 may include operating system 316. Operating system 316, in some examples, controls the operation of components of network security device 300, and provides an interface from various applications such as network protection module 322 to components of network security device 300. For example, operating system 316, in one example, facilitates the communication of various applications such as network protection module 322 with processors 302, communication unit 310, storage device 312, input device 306, and output device 308. Applications such as network protection module 322 may include program instructions and/or data that are executable by computing device 300. As one example, network protection module 322 provides network protection proxy functions using proxy module 324, determines what devices on a private network to selectively protect via configuration module 326, and performs malware protection functions for protected devices using malware protection module 328. These and other program instructions or modules may include instructions that cause network security device 300 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of selecting devices on a private network for security protection via a network security device, comprising:
    classifying devices on the private network into devices that are sometimes protected and devices that are always either protected or not protected;
    detecting a threat comprising at least one of a macro security event and a local security event, the macro security event detected by one or more external systems and the local security event detected by one or more devices local to the private network;
    determining whether the detected threat is a threat to one or more devices on the private network classified as devices that are sometimes protected; and
    selectively protecting the one or more devices that are sometimes protected if the detected threat is determined to be a threat to the one or more devices that are sometimes protected.

2. The method of selecting devices on a private network for security protection via a network security device of claim 1, wherein devices that are always protected comprise devices that receive little network traffic from a public network.

3. The method of selecting devices on a private network for security protection via a network security device of claim 1, wherein devices that are never protected comprise devices that have high computational capability or that are configured to execute their own security software.

4. The method of selecting devices on a private network for security protection via a network security device of claim 1, wherein devices that are sometimes protected comprise devices that receive substantial network traffic from the public network at least periodically and that do not execute their own security software.

5. The method of selecting devices on a private network for security protection via a network security device of claim 1, wherein detection of a threat further comprises knowledge of one or more security events provided via a threat feed.

6. The method of selecting devices on a private network for security protection via a network security device of claim 1, wherein determining whether the detected threat is a threat to one or more devices on the private network classified as devices that are sometimes protected comprises evaluating at least one of: a physical geography of the detected threat, a network location of the detected threat, and a type of device or devices affected by the network threat.

7. The method of selecting devices on a private network for security protection via a network security device of claim 1, wherein selectively protecting the one or more devices that are sometimes protected is further based on whether the detected threat is a local threat or macro threat, such that a local threat results in a greater likelihood of selectively protecting a device that is sometimes protected.

8. The method of selecting devices on a private network for security protection via a network security device of claim 1, wherein selectively protecting the one or more devices that are sometimes protected is achieved by Address Resolution Protocol (ARP) spoofing to insert the network security device in the network path between the selectively protected device and one or more public network devices.

9. The method of selecting devices on a private network for security protection via a network security device of claim 1, further comprising selectively removing protection from the one or more devices that are sometimes protected if the detected threat is determined to no longer be a threat to the one or more devices that are sometimes protected.

10. The method of selecting devices on a private network for security protection via a network security device of claim 1, wherein the network security device is connected to the private network and configured to communicate with a public network (cloud) security provider.

11. A network security device, comprising:
    a processor and a memory;
    a malware protection module operable when executed on the processor to detect a threat comprising at least one of a macro security event and a local security event, the macro security event detected by one or more external systems and reported to the network security device and the local security event detected by the network security device or another device local to the private network and reported to the network security device;
    a configuration module operable when executed on the processor to classify devices on a private network into devices that are sometimes protected and devices that are always either protected or not protected, and to determine whether the detected threat is a threat to one or more devices on the private network classified as devices that are sometimes protected;
    a proxy module operable when executed on the processor to selectively protect the one or more devices that are sometimes protected if the detected threat is determined to be a threat to the one or more devices that are sometimes protected by configuring the network so that data flows between the selectively protected devices and the public network are routed through the network security device.

12. The network security device of claim 11, wherein devices that are always protected comprise devices that receive little network traffic from a public network.

13. The network security device of claim 11, wherein devices that are never protected comprise devices that have high computational capability or that are configured to execute their own security software.

14. The network security device of claim 11, wherein devices that are sometimes protected comprise devices that receive substantial network traffic from the public network at least periodically and that do not execute their own security software.

15. The network security device of claim 11, wherein detecting a threat further comprises receiving knowledge of one or more security events provided via a threat feed.

16. The network security device of claim 11, wherein determining whether the detected threat is a threat to one or more devices on the private network classified as devices that are sometimes protected comprises evaluating at least one of: a physical geography of the detected threat, a network location of the detected threat, and a type of device or devices affected by the network threat.

17. The network security device of claim 11, wherein selectively protecting the one or more devices that are sometimes protected is further based on whether the detected threat is a local threat or macro threat, such that a local threat results in a greater likelihood of selectively protecting a device that is sometimes protected.

18. The network security device of claim 11, wherein selectively protecting the one or more devices that are sometimes protected is achieved by Address Resolution Protocol (ARP) spoofing to insert the network security device in the network path between the selectively protected device and one or more public network devices.

19. The network security device of claim 11, the proxy module further operable to selectively remove protection from the one or more devices that are sometimes protected if the detected threat is determined to no longer be a threat to the one or more devices that are sometimes protected.

20. The network security device of claim 11, wherein the network security device is connected to the private network and configured to communicate with a public network (cloud) security provider.

\* \* \* \* \*